United States Patent
Ghoneim et al.

(10) Patent No.: US 6,282,479 B1
(45) Date of Patent: Aug. 28, 2001

(54) VEHICLE STABILITY ENHANCEMENT SYSTEM IN HIGH CENTER OF GRAVITY VEHICLE

(75) Inventors: Youssef Ahmed Ghoneim, Macomb Township; David Michael Sidlosky, Huntington Woods, both of MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 09/374,009

(22) Filed: Aug. 16, 1999

(51) Int. Cl.[7] ..................................................... B60T 8/58
(52) U.S. Cl. .......................... 701/70; 701/48; 701/72; 303/140; 303/146
(58) Field of Search .................................. 701/48, 69, 70, 701/72, 78, 79; 180/197; 303/147, 140, 146

(56) References Cited

U.S. PATENT DOCUMENTS 5,720,533 * 2/1998 Pastor et al. .................... 303/147
5,746,486   5/1998 Paul et al. ...................... 303/146

* cited by examiner

Primary Examiner—William A. Cuchlinski, Jr.
Assistant Examiner—Arthur D. Donnelly
(74) Attorney, Agent, or Firm—George A. Grove

(57) ABSTRACT

A method is disclosed for improving the estimate of vehicle yaw rate in the computer of the brake or traction control system of a vehicle, like a truck or sport utility vehicle, having a relatively high center of gravity and tending to roll during yaw. Yaw is typically estimated by sensing the speed of the non-driven wheels, determining the difference between the wheel velocities and dividing the difference by the track of the wheels. A table of correction factors correlated with vehicle speed is prepared and used to compensate for the effect of roll on yaw rate.

10 Claims, 1 Drawing Sheet

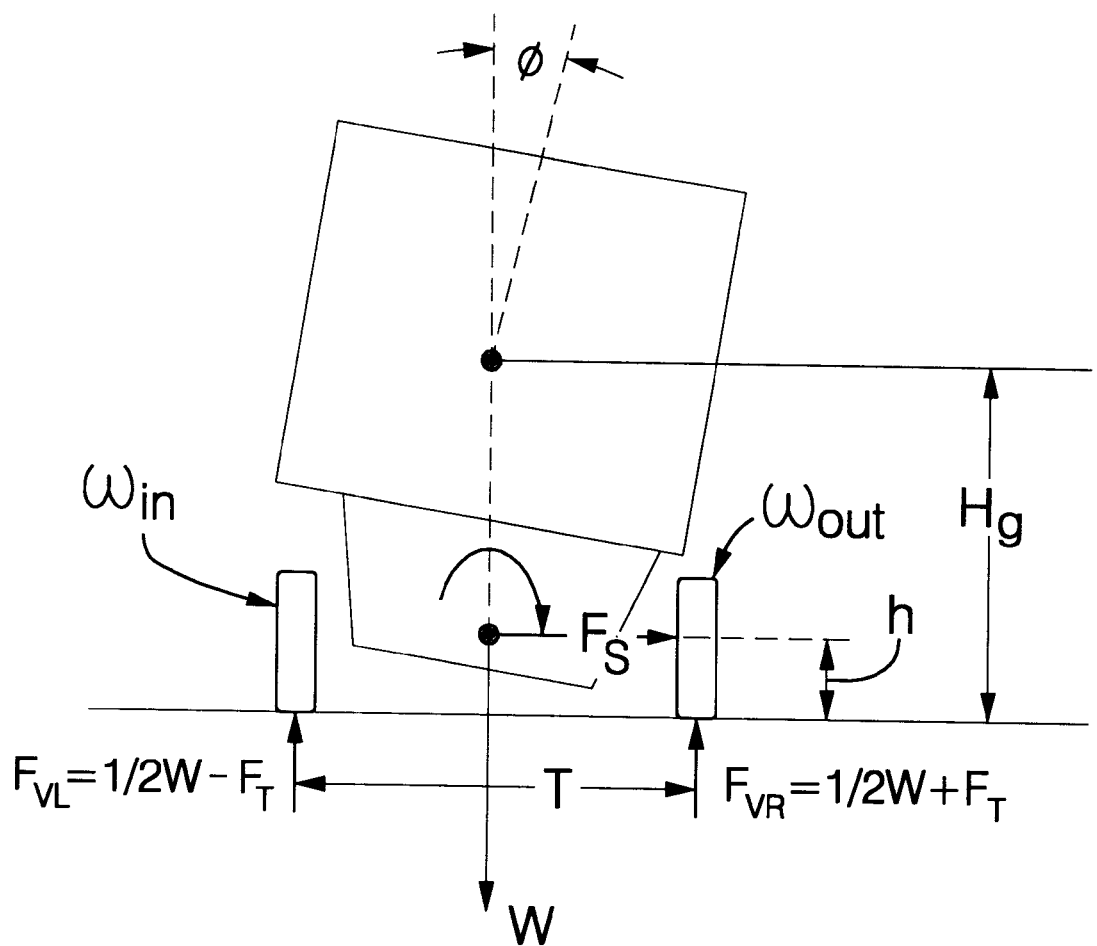

VEHICLE STABILITY ENHANCEMENT SYSTEM IN HIGH CENTER OF GRAVITY VEHICLE

TECHNICAL FIELD

This invention pertains to microprocessor-based brake control systems for vehicles. More specifically, it relates to a method of estimating the yaw rate of a vehicle having a relatively high center of gravity and significant body roll during turning maneuvers.

BACKGROUND OF THE INVENTION

Automotive vehicles have been produced with computer-controlled brake systems that modulate brake force during stops to provide anti-lock brake (ABS) control and/or that modulate brake force during vehicle acceleration to provide positive acceleration traction control (TCS). Recently, more comprehensive computer-based vehicle control systems have been developed that provide additional chassis control under braking or positive acceleration conditions. Such systems are described, e.g., in U.S. Pat. Nos. 5,720,533 and 5,746,486, both entitled "Brake Control System" and assigned to the assignee of this invention. These systems seek to control, among other parameters, the yaw rate of the vehicle.

The computer in the chassis control systems described in these patents uses signals from a variety of sensors such as wheel speed sensors, steering wheel angle sensors, brake switch sensor, master brake cylinder pressure sensor, yaw rate sensor, lateral accelerometer and the like. For further development of such control systems, it is desirable and/or necessary to provide algorithms or computer-controlled processes for eliminating some of such sensors or for detecting faults in their operation.

For example, a process has been developed that permits vehicle control based on an estimated yaw rate rather than the output of a yaw rate sensor or lateral accelerometer. This practice is described in U.S. Ser. No. 09/080,372, filed May 18, 1998, titled "Vehicle Yaw Control Based on Yaw Rate Estimate" and assigned to the assignee of this invention.

The vehicle yaw rate can be computed as a function of the measured speeds of the non-driven wheels of the vehicle and the distance between the center of the wheel treads (i.e., the track). However, the estimate may fail to equal the actual vehicle yaw in a vehicle with a relatively high center of gravity due to the relatively high body roll of the vehicle. When a vehicle with large body roll and high center of gravity is driven under high lateral acceleration, the outside tire is compressed and the radius of the inside tire is increased. Therefore, the estimated yaw rate is higher than the actual yaw rate of the vehicle. It is desired to compensate for the yaw rate estimation, without a yaw sensor or lateral acceleration sensor, and control vehicle yaw rate even during conditions that have previously degraded the yaw rate estimation such as in vehicles with large body roll and high center of gravity.

SUMMARY OF THE INVENTION

This invention is typically applicable for estimating the yaw rate in automotive vehicles incorporating a computer-based antilock brake system (ABS), a traction control system (TCS), or the like, in combination with vehicle yaw control. It is applicable in such systems in which at least two of the vehicle wheels, i.e., the front wheels or the rear wheels, are not driven. In vehicle control systems of this type, the microprocessor-based controller receives data from wheel speed sensors, a brake actuator sensor and a steering angle sensor, among other possible data sources, in the course of its control of brake actuators for each wheel. A yaw rate sensor and/or a lateral acceleration sensor may also be employed. However, as stated above, methods have been developed that permit vehicle yaw control based on an estimated yaw rate rather than the output of an accelerometer.

A good estimation of yaw rate can be obtained by determining the difference in the sensed velocities of the non-driven wheels and dividing that difference by the known track of the wheels. The subject invention provides an improvement to such an estimation that is particularly useful in vehicles that have a relatively high center of gravity and experience a significant vehicle roll during yaw.

In accordance with the invention, a table of correction factors, also called gain factors, is determined for the vehicle. These gain factors are correlated with vehicle speed. The gain factors are a function of the sprung mass of the vehicle, the height of the vehicle center of gravity, the height of the roll center of the wheels, the track of the vehicle wheels and the radii of the wheels. There is also a dependence on tire stiffness. Preferably, the gain factor data is determined experimentally on a prototype to correlate vehicle velocities with actual yaw rates. Such data may, for example, be stored for reference in a look-up table in the permanent memory of the microprocessor-based controller. Thus, an instantaneous initial value for yaw rate, based solely on wheel speed and track, may be modified by use of a referenced, velocity-based gain factor in a manner described fully in the description of a preferred embodiment.

An advantage of the invention is that yaw rates for trucks and other relatively high center-of-gravity vehicles may be more accurately estimated for use in automotive computer-based brake and traction control systems. Other objects and advantages of this invention will become apparent from a detailed description of a specific embodiment.

BRIEF DESCRIPTION OF THE DRAWINGS

The drawing FIGURE is a free body diagram of an automotive vehicle, viewed from the back, showing dimensions and parameters used in establishing yaw rate correction factors used in the practice of the invention.

DESCRIPTION OF A PREFERRED EMBODIMENT

This invention is applicable in vehicle brake control and traction control systems such as those described in the above cited '533 and '486 patents. It is particularly applicable when such control systems are controlled by a computer-based system that estimates the yaw rate of the vehicle rather than using a yaw sensor or lateral accelerometer. The processes described in co-pending U.S. Ser. No. 09/080,372, filed May 18, 1998, is an example of such a yaw rate estimation practice, and the entire disclosure of that application is hereby incorporated herein by reference. One practice of estimating the yaw rate at a specific instant is to sense the velocities of the non-driven wheels, calculate the difference in their velocities and divide the difference by the track of the wheels [equation (2) in said application]. Of course, the mathematical sign (+ or −) of the difference and quotient are interpreted consistently with the direction of the yaw. For many applications, this estimate is very satisfactory, but when the vehicle (such as one with a relatively high center of gravity) experiences significant roll during yaw, the above prior art estimation overstates the yaw rate. The subject invention provides an improvement in yaw estimation in vehicle roll situations.

As stated above, this invention uses a correction factor or gain, K, to improve a yaw estimate that does not include a contribution from vehicle roll. A description of the mathematical basis for the determination of the gain factor, K, follows. In the description, reference is made to the drawing figure.

In the free body illustration of a vehicle in the drawing, the roll force is to the right side of the diagram. Symbols have the following meanings:

$M_S$ is the sprung mass in (kg)

h is the height of the roll center (m)

$H_g$ is the height of the center of gravity (m)

$\omega_{in}$, $\omega_{out}$ are the rotational speeds of the inside and outside tires with respect to roll direction) in radians/sec $F_{VR}$, and $F_{VL}$ are the right and left wheel vertical forces (N)

W is the weight force (kg)

T is the track of the vehicle (m)

$F_T$ is the lateral load transfer (N)

$F_S$ is the sprung mass side force=$M_S a_y$ (N)

φ is the roll angle of the vehicle

Neglecting the effect of the unsprung mass and taking the moments about the center of contact for the inside tire (with respect to the roll direction) yields:

$$M_s a_y h - F_{VR} T + \frac{WT}{2} = M_s a_y h - F_T T = 0 \quad (1)$$

where R is the radius of the tire under normal condition (no vehicle roll) and $a_y$ is the lateral acceleration of the vehicle.

Since the lateral acceleration in this vehicle is not measured, it is approximated by $$a_y \approx \dot{\varphi} V_x$$

where $\dot{\varphi}$ is the compensated yaw rate of the vehicle, and $V_x$ is the vehicle speed calculated from the wheel speeds in a known manner.

Therefore, Equation (1) can be recast as:

$$F_T \approx \frac{M_s \dot{\varphi} V_x h}{T} \quad (2)$$

Define the roll coefficient $J_r$ $$J_r = \frac{h}{H_g} \quad (3)$$

Therefore equation (2) can be written as $$F_T \approx \frac{M_s \dot{\varphi} V_x J_r H_g}{T} \quad (4)$$

R is defined as the unloaded radius of the tire; in practice it is measured through the unloaded tire circumference. $R_l$ is the loaded radius of the tire. It is the radius after load transfer during roll and is the distance of the wheel axis from the ground under roll loading. Thus, the tire vertical reflection is designated as $\delta_t$ and $\delta_t = R - R_l$. The tire vertical deflection is quite closely proportional to the vertical force.

Tire vertical stiffness $k_t$ is defined as $$k_t = \frac{F_{VR} - F_{VL}}{\delta_t} = \frac{F_T}{2\delta_t} \quad (5)$$

$k_t$ depends on the size, construction and inflation pressure. A typical value is 250N/mm. The tire vertical stiffness generally increases with load capacity, rim width. Increasing speed increases the stiffness at about 0.004 m/sec.

Hence, $$k_t = k_{to}(1+0.004V_x), \text{ where } V_x \text{ is in m/sec.} \quad (6)$$

The inner and outer wheel radii are given by $$R_i = R + \delta_t, R_{out} = R - \delta_t \quad (7)$$

The estimated yaw rate obtained from the non-driven wheel speeds is given by $$\dot{\varphi}_{est} = \frac{R(\omega_{out} - \omega_{in})}{T} \quad (8)$$

The compensated yaw rate of the vehicle is given by $$\dot{\varphi} = \frac{(R-\delta_t)\omega_{out} - (R+\delta_t)\omega_{in}}{T} \quad (9)$$

$$= \dot{\varphi}_{est} - \frac{\delta_t(\omega_{in} + \omega_{out})}{T}$$

$$\approx \dot{\varphi}_{est} - \frac{\delta_t V_x}{2TR}$$

where $V_x$ is the vehicle speed and it is approximated by the average of the non-driven wheel speeds.

First, substitute Equations (5,6) into Equation (4)

$$\delta_t = \frac{M_s J_r H_g}{2T k_{to}(1+0.004V_x)} \dot{\varphi} V_x \quad (10)$$

Substitute Equation (10) into Equation (9)

$$\dot{\varphi} = \dot{\varphi}_{est} - \frac{M_s J_r H_g V_x}{(2T)^2 R k_{to}(1+0.004V_x)} \dot{\varphi} V_x \quad (11)$$

Multiply and divide the RHS of Equation (11) by |φ̇| to yield $$\dot{\varphi} = \dot{\varphi}_{est} - K\dot{\varphi}|\dot{\varphi}|V_x^2 \quad (12)$$

where $$K = \frac{M_s J_r H_g}{(2T)^2 R k_{to}(1+0.004V_x)|\dot{\varphi}|} \quad (13)$$

Rearrange equation (11)

$$\dot{\varphi} = \frac{\dot{\varphi}_{est}}{1 + KV_x|\dot{\varphi}V_x|} \quad (14)$$

The equation (14) is a rough approximation of the yaw compensation in a significant roll situation and it is preferred to employ the gain K to improve the estimation. Equation (14) is a preferred method of converting an estimated yaw rate to a value compensated for roll. Thus, the gain K is defined as in Equation (13). It was found in vehicle testing that the value of the gain K depends on the yaw rate and the vehicle velocity in a nonlinear fashion. That is why it is preferable to use a gain table rather than a direct computation of the gain.

Following is an illustration of the creation of a gain table for a vehicle. The present gain table is as follows. Consider the following example:

$M_S$=1500 kg $H_g$=0.6 m $J_r$=0.5

$k_{t0}$=250000 M/m

R=0.31 m

T=1.5 m

Applying these values to equation (13), assuming a vehicle speed of 20 m/sec, the following 2D table is obtained:

| 0 | 3 | 6 | 9 | 12 | 15 | YawV$_x$ (m/sec$^2$) |
|---|---|---|---|----|----|----|
| 0.0 | 3.98 | 1.99 | 1.32 | 1.0 | 1.5 | K*1000 |

Following is an illustration of the use of a gain factor in an estimation of the yaw rate of a vehicle subject to a significant roll force. In this illustration, equation (14) is used in the following form.

$$Yaw\_est\_comp(k) = \frac{Yaw\_est(k)}{1 + K * V_x * YawV_x(k)_f}$$

Yaw$_{13}$ est (k) is the estimated value of the yaw rate at processor interval k as determined by calculating the difference between the rotational velocities of the non-driven wheels as reported by the velocity sensors at the wheel and dividing the difference by the track (t) of the wheels. Yaw x $V_x$ (k) is the product of a yaw rate and vehicle velocity at interval k. The product is a measure of the lateral acceleration of the vehicle. For purposes of this embodiment, this product can be suitably computed from the absolute value of the compensated yaw estimate at interval k−1(the previous microprocessor interval) and the vehicle velocity at that interval, k−1.

Thus,

YawV$_x$(k)=|Yaw_est_comp)*V$_x$ (k−1)| where Yaw_est_comp(k−1) is the yaw rate estimate compensated at processor interval (k−1), and $V_x$ is the vehicle speed at that time. The absolute value of this product is used. This product is based on raw computer data and, therefore, is preferably mathematically filtered. YawV$_x$(k) is filtered using a filter constant $f_c$=0.1 as follows:

YawV$_x$(k)$_f$=$f_c$(YawV$_x$(k)−YawV$_x$(k−1)$_f$)+YawV$_x$(k−1)$_f$

The estimated value of yaw at interval k, Yaw_est(k), having been determined and the value of the product YawVx (k)$_f$ having been determined and filtered, it remains to determine a value for the gain K. This is done by reference to the lookup table created as illustrated above. Thus, all variables are determined, and the current value for estimated and roll tendency compensated yaw at interval k, Yaw_est_comp, is thus determined.

Of course, this process is repeated at each processing interval, k, of the yaw estimation subroutine in the brake or traction control process.

It has been demonstrated in vehicle tests that compensated yaw rate values determined by the process of this invention compare very favorably to the actual yaw rate of the vehicle measured using a yaw rate sensor. Thus, by using this yaw rate estimation process to compensate for the roll force of a relatively high center-of-gravity vehicle, the performance of brake and traction control methods based on yaw estimates are markedly improved.

What is claimed is:

1. A method of estimating the yaw rate in a vehicle subject to roll forces deflecting the radii of the vehicle's tires during yaw, said vehicle having a four wheel brake system, a velocity sensor at each wheel, two non-driven wheels and a brake actuation system adapted to manage the yaw rate of the vehicle in response to the output of a programmed microprocessor issuing brake actuator control signals at regular processing intervals, said method comprising:

making a first estimate of yaw rate of said vehicle by sensing the velocities of said non-driven wheels, determining the difference between said velocities, and dividing said difference by the track of said wheels, and modifying said estimated yaw rate by application of an experimentally-determined roll correction factor for said vehicle that is a function of the velocity of the vehicle, the mass of the vehicle, the height of the roll center of said wheels with their tires, the track of said non-driven wheels, and the radius and stiffness of said tires.

2. A method as recited in claim 1 comprising storing a lookup table of values of said roll correction factors correlated with vehicle velocities in the memory of said microprocessor.

3. A method as recited in claims 1 or 2 in which roll correction factors are determined on a prototype vehicle as a function of actual yaw rate and vehicle velocity for use by said microprocessor.

4. A method as recited in claim 1 in which the roll effect corrected yaw rate is determined comprising calculating the quotient of a said estimated yaw rate as numerator and a denominator that comprises the sum of one and a product comprising factors of a said roll correction factor, the velocity of the vehicle and a factor that is a function of the estimated lateral acceleration of the vehicle at a previous estimation interval.

5. A method as recited in claim 2 in which the roll effect corrected yaw rate is determined comprising calculating the quotient of a said estimated yaw rate as numerator and a denominator that comprises the sum of one and a product comprising factors of a said roll correction factor, the velocity of the vehicle and a factor that is a function of the estimated lateral acceleration of the vehicle at a previous estimation interval.

6. A method as recited in claim 3 in which the roll effect corrected yaw rate is determined comprising calculating the quotient of a said estimated yaw rate as numerator and a denominator that comprises the sum of one and a product comprising factors of a said roll correction factor, the velocity of the vehicle and a factor that is a function of the estimated lateral acceleration of the vehicle at a previous estimation interval.

7. A method as recited in claim 4 in which said denominator is the sum of one, and a product comprising factors of a said roll correction factor, the velocity of said vehicle and the absolute value of the product of an estimated yaw rate and the velocity of said vehicle.

8. A method as recited in claim 5 in which said denominator is the sum of one, and a product comprising factors of a said roll correction factor, the velocity of said vehicle and the absolute value of the product of an estimated yaw rate and the velocity of said vehicle.

9. A method as recited in claim 6 in which said denominator is the sum of one, and a product comprising factors of a said roll correction factor, the velocity of said vehicle and the absolute value of the product of an estimated yaw rate and the velocity of said vehicle.

10. A method as recited in claim 1 comprising making repeated estimates of said yaw rate at sequential intervals, k−1 and k, in which estimates a roll corrected value of yaw rate for interval k−1 is used in the correction of an uncorrected estimate for interval k.

* * * * *